United States Patent [19]

Ford

[11] 3,953,270

[45] Apr. 27, 1976

[54] MANUFACTURE OF REINFORCED ELASTOMERIC HOSE

[75] Inventor: Gary P. Ford, Trotwood, Ohio

[73] Assignee: General Motors Corporation, Detroit, Mich.

[22] Filed: Nov. 5, 1974

[21] Appl. No.: 520,984

[52] U.S. Cl. ............................... 156/80; 138/124; 138/129; 138/144; 156/149; 156/169; 156/177; 156/188; 156/244; 264/28; 264/237; 264/348

[51] Int. Cl.² ........................................... B24B 3/00

[58] Field of Search ............ 156/80, 143, 149, 244, 156/169, 177, 172, 184, 185, 187, 188; 264/28, 237, 348; 138/123–126, 127, 129

[56] References Cited
UNITED STATES PATENTS

| 598,550 | 2/1898 | Work | 264/28 |
|---|---|---|---|
| 1,944,970 | 1/1934 | Dieffenbach | 156/80 |
| 2,895,172 | 7/1959 | Meissner | 156/80 |
| 2,974,713 | 3/1961 | Hydrick, Jr. | 156/149 |
| 3,049,762 | 8/1962 | Jackson | 264/28 |
| 3,414,448 | 12/1968 | Harpfer | 156/149 |

*Primary Examiner*—Edward G. Whitby
*Attorney, Agent, or Firm*—Peter P. Kozak

[57] ABSTRACT

This invention comprises a method for manufacturing elastomeric high pressure hose having reinforcement in the form of braided or spiral wrapped textile yarns between extruded inner and outer elastomeric layers. The method includes the steps of extruding the inner elastomeric layer over a long flexible mandrel up to about 1000 ft in length coextensively therewith, then progressively freezing portions of the layer and braiding or spiral wrapping a textile reinforcement thereover. The layer is frozen to prevent extrusion of the inner layer during the braiding. Thereafter additional elastomeric and textile layers are applied and the elastomers are vulcanized in an elongated continuous vulcanizer.

3 Claims, 5 Drawing Figures

U.S. Patent   April 27, 1976   3,953,270
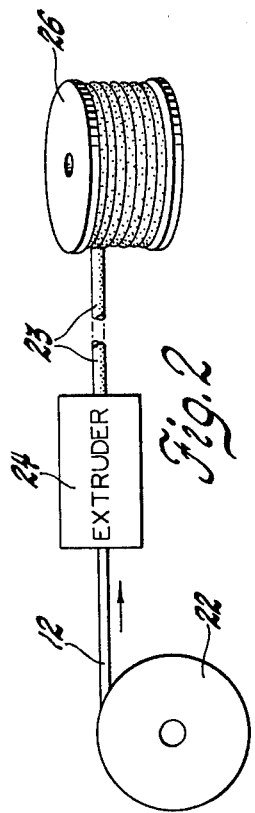
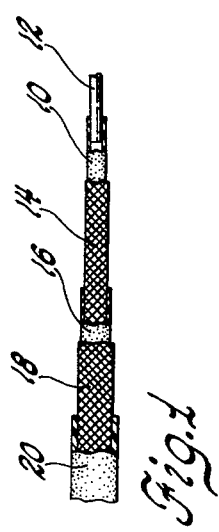
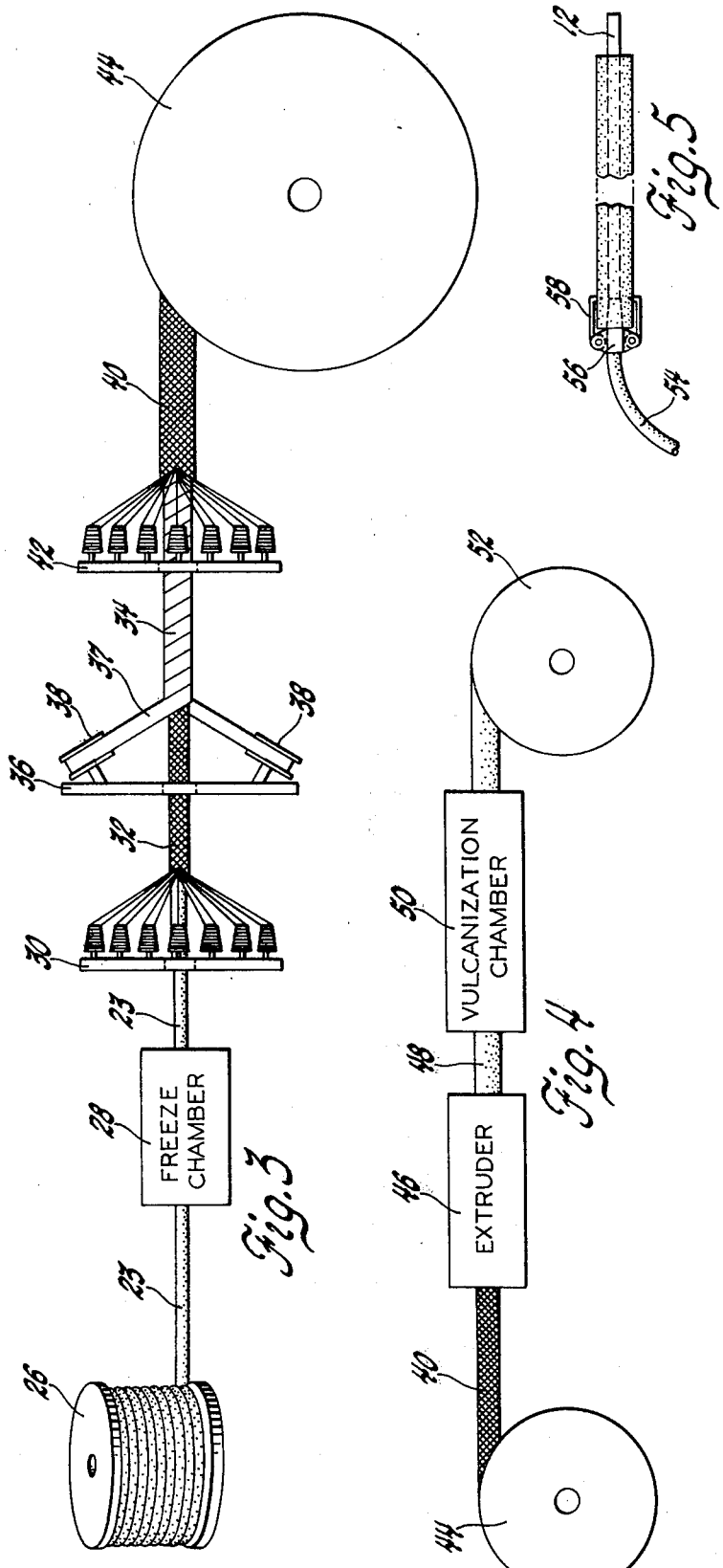
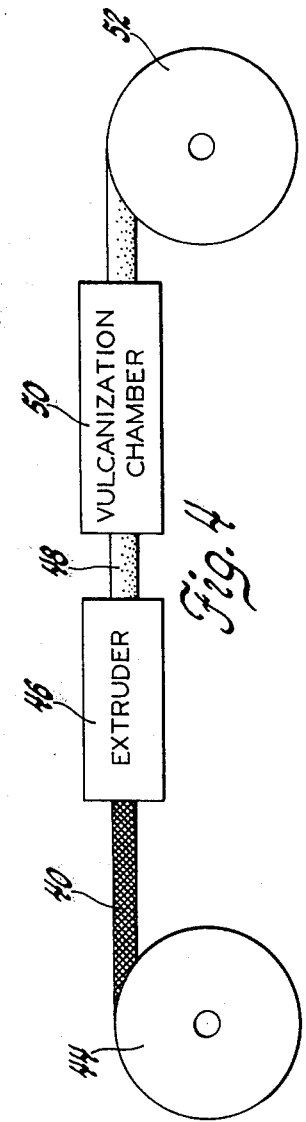
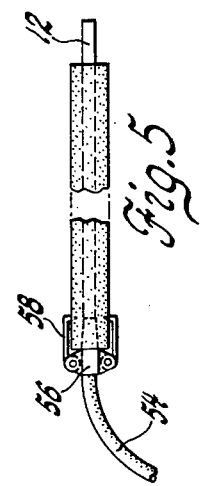

MANUFACTURE OF REINFORCED ELASTOMERIC HOSE

BACKGROUND OF THE INVENTION

This invention relates to the manufacture of flexible high pressure textile reinforced elastomeric hose, such as brake hose.

Heretofore the procedure for making high pressure textile reinforced hose included the basic steps of extruding a layer of uncured elastomer over about one-half the length of a 25 foot relatively rigid steel mandrel. A textile yarn reinforcement was then braided along the entire length of the mandrel beginning at the elastomer coated end. As the braiding advanced along the length of the mandrel the elastomer was compressed and further extruded thereby along the entire length of the mandrel. In subsequent steps an elastomeric cushion layer, a textile braided layer and an elastomeric cover layer were sequentially applied and the elastomeric portions were vulcanized.

The shortcoming of this method is basically economic in that the hose is necessarily made in relatively short lengths of about 25 feet and each length must be separately handled through the various extrusion, braiding, wrapping and vulcanizing steps at considerable expense in time, labor and equipment.

SUMMARY OF THE INVENTION

The method of the present invention produces hose of at least equal quality as that made by the prior art method described above but with greatly improved efficiency in lengths up to 1,000 feet or more. The method comprises extruding the inner elastomeric layer on to a flexible mandrel coextensively therewith, then passing the inner layer progressively through a freeze means operative to progressively freeze the layer, then braiding or spiral wrapping a textile reinforcement over the layer without extrusion of the inner layer due to its frozen state, then spiral wrapping an uncured elastomeric cushion over the textile wrapping, then braiding or spiral wrapping a second textile reinforcement over the cushion layer, then extruding an outer elastomeric sheath or layer over the second reinforcement layer and finally vulcanizing the uncured elastomers.

Other advantages and features will be apparent from the following detailed description of the invention made with reference to the drawings.

BRIEF DESCRIPTION OF THE DRAWINGS

FIG. 1 is an elevation view with parts broken away of the hose made by the method of this invention associated with the mandrel.

FIGS. 2, 3 and 4 are a diagrammatic view of the equipment and sequence of operations in carrying out the method of this invention through the vulcanizing step.

FIG. 5 illustrates a method of removing the mandrel from the hose after vulcanization.

DESCRIPTION OF PREFERRED EMBODIMENTS

Referring to FIG. 1 of the drawing, the method of this invention is operative to produce high pressure textile reinforced elastomeric hose useful for example as hydraulic automotive brake hose comprising an inner elastomeric layer 10 extruded onto a mandrel 12, a first textile reinforcement layer 14 braided as shown or wrapped over the inner layer 10, an uncured elastomeric cushion layer 16 wrapped over the reinforced layer 14, a second textile reinforcement layer 18 braided as shown or wrapped about the cushion layer 16 and an outer elastomeric layer 20 extruded about the textile layer 18. The elastomers are vulcanized and the mandrel 12 is removed to form the hose. As will be hereinafter described the hose is formed in relatively long lengths which are subsequently cut up into desired shorter lengths and provided with attachment fixtures or the like.

In the practice of the invention a flexible mandrel 12 is wound on a spool 22 as shown in FIG. 2. A suitable mandrel preferably consists of a wire reinforced ⅛ inch thick Nylon cylinder about 1,000 feet long. The mandrel may be any length up to 8,000 feet but a 1,000 foot mandrel is an efficient length. The mandrel is preferably coated with a suitable lubricant such as a silicone resin or a Teflon dispersion in tri-chloroethane which serves as a parting agent to prevent the hose from sticking to the mandrel thereby facilitating the removal of the hose from the mandrel after vulcanization.

An inner tube or layer of unvulcanized rubber 23 is first extruded over the mandrel 12 along the entire length thereof by means of the cross head extruder or die 24 and wound onto the reel 26.

In the extruding step the mandrel is preferably moved at a speed of about 300 feet per minute. If desired the mandrel speed may successfully be varied between 40 and 500 feet per minute. The radial thickness of the layer 23 is preferably about 0.040 inch. A suitable rubber recipe for the inner tube is as follows:

| | |
|---|---|
| Polychloroprene | 100 Parts By Weight |
| Magnesium Oxide | 4 Parts By Weight |
| Neozone A (N-Phenyl-l-Naphthyl Amine) | 2 Parts By Weight |
| FEF Carbon Black (Fast Extrusion Furnace Carbon Black) (ASTM N556) | 60 Parts By Weight |
| Butyl Oleate | 15 Parts By Weight |
| Stearic Acid | 0.5 Parts By Weight |
| Zinc Oxide | 5 Parts By Weight |
| N.A. 22 (Ethylenethiourea) | 0.35 Parts By Weight |

In the second phase of the method as shown in FIG. 3, the layer 23 with the supporting mandrel 12 is then unreeled from the reel 26 and passed through the freeze chamber 28 at a rate of about 2.2 feet per minute. The freeze chamber 28 is a heat exchanger in the form of a tube about 8 feet long which is maintained at a temperature of about −60°F. Satisfactory freezing rates of 2 to 2.5 feet per minute are obtained in a freeze tube 5½ to 8 feet long maintained at a temperature of −50°F to −70°F. The freezing temperatures are preferably maintained by liquid nitrogen surrounding the freezer tube.

The layer 23 emerges from the freeze chamber 28 frozen solid and is immediately passed through a first textile braider 30 which applies a braided textile layer 32 thereover preferably comprising Rayon yarn. The structure of the braider 30 is well known in the art and will not be further described herein. The pressure of the textile layer 32 does not extrude the layer 23 even though it is tightly braided thereon due to its frozen condition. Alternatively the textile reinforced may be spiral wound. It is only necessary for the elastomer to remain frozen until the braided layer 32 has been applied.

Next a thin layer 34 of uncured elastomer is snugly wrapped about the braided layer 32 by means of the spiral wrapping device 36 carrying strips 37 of the elastomer on the reels 38. This device is likewise well known in the art and will not be further discussed herein. The strips 37 are preferably 1 to 1/32 inch wide and about 0.018 inch thick. A satisfactory formulation for these strips is as follows:

| | |
|---|---|
| Styrene - Butadiene Polymer | 100 Parts By Weight |
| HAF-LS Black (High Abrasive-Low Structure Carbon Black) (ASTM-327) | 60 Parts By Weight |
| Zinc Oxide | 5 Parts By Weight |
| Stearic Acid | 1.5 Parts By Weight |
| Agerite Resin D (Polymerized Trimethyl dihydro quinoline) | 2 Parts By Weight |
| Light Process Oil (Low Viscosely Petroleum Oil) | 10 Parts By Weight |
| Sulfur | 1.5 Parts By Weight |
| NOBS Special (N Oxy Diethylene Benzothiazole-2-Sulfenamide) | 2 Parts By Weight |

Thereafter a second braided or spiral wrapped textile layer 40 is tightly applied by the braider 42 which is preferably identical to the first textile layer 32. In consequence of the application of the second textile layer, the elastomeric material of the cushion layer is forced into the spaced between the textile yarns. The structure is then coiled on the reel 44 and is ready for the final hose forming operation shown in FIG. 4.

The hose structure is unreeled from the reel 44 and passed through the extruder 46 wherein an elastomeric cover layer 48 is applied and thereafter the hose structure is passed through the steam vulcanization chamber 50 wherein the inner and cover elastomeric layers are vulcanized and the tube structure is coiled onto the reel 52. The tube structure is passed preferably through the extruder 46 and the steam vulcanization chamber 50 at about 165 feet per minute wherein it is continuously vulcanized to accomplish vulcanization at this rate. The vulcanization chamber is preferably in the form of a tube several hundred feet long holding steam at about 250 psi and 405°F. Steam pressures rainging from 200 to 250 psi gauge may be successfully used.

In the past it was believed necessary to coat the second textile layer with a suitable elastomeric adhesive to insure that the cover layer 48 is strongly bonded to the underlying textile layer. This has been found unnecessary in the method of this invention and is considered an optional step. A suitable recipe for the cover layer 48 is as follows:

| | |
|---|---|
| Polychloroprene | 100 Parts By Weight |
| Mg O | 4 Parts By Weight |
| Neozone A | 2 Parts By Weight |
| FEF Carbon Black | 50 Parts By Weight |
| Butyl Oleate | 20 Parts By Weight |
| Stearic Acid | 0.5 Parts By Weight |
| Zinc Oxide | 5 Parts By Weight |
| N.A. 22 | 0.35 Parts By Weight |

After the hose structure has been vulcanized the mandrel is removed therefrom by means of high water or air pressure in the neighborhood of 2,700 psi applied to one end of the hose structure by means of the hose 54 having the nozzle 56 insertable into the hose and held there by the clamp means 58 while the hose is held loosely rolled about a drum (not shown).

The method is conveniently performed in three phases as illustrated in FIGS. 2, 3 and 4 respectively because of the varied time required to perform the several operations described. Thus the first extrusion application shown in FIG. 2 may be performed at about 300 feet per minute in suitable lengths up to about 8,000 feet.

The freezing, braiding and wrapping operations are performed much more slowly in the vicinity of 2 to 3 feet per minute. Each of these operations are performed sequentially at the same speed as shown in FIG. 3.

Finally the final extrusion and vulcanization is performed relatively fast in the neighborhood of 165 feet per minute. With the above arrangement it is apparent that a single extruder 24 may be used to supply many process lines of the type shown in FIG. 3 and a single extrusion and vulcanizer line as shown in FIG. 4 may serve many lines of FIG. 3.

Although the invention has been disclosed in terms of specific embodiments and examples it will be obvious that others may be used within the scope and spirit of the invention.

What is claimed is:

1. Method of making reinforced elastomeric high pressure hose comprising the steps of:
   extruding a layer of an uncured elastomer over a flexible mandrel coextensively therewith,
   freezing at least a portion of said layer,
   tightly applying a textile reinforcing layer over said portion while it is frozen to prevent further extrusion of said layer, said textile layer being applied with sufficient pressure to cause further extrusion of said layer in its unfrozen condition, and
   sequentially applying additional elastomeric and reinforcing textile layers, curing the uncured elastomeric layers and removing said mandrel.

2. Method of making reinforced elastomeric high pressure hose comprising the steps of:
   extruding a first layer of an uncured elastomer over a flexible mandrel coextensively therewith,
   progressively freezing said layer from one end to the other,
   tightly applying a first textile reinforcing layer over said layer while it is frozen to prevent further extrusion thereof, said textile layer being applied with sufficient pressure to cause further extrusion of said layer in its unfrozen condition,
   wrapping an uncured elastomeric cushion layer over said first textile layer,
   tightly applying a second textile reinforcing layer over said cushion layer with said cushion layer being forced to enter and fill the spaced between the yarns of said textile layers,
   extruding an uncured elastomeric cover layer over said second textile layer, and
   heating said uncured layers to obtain a cure thereof and removing said mandrel from the resulting hose.

3. Method of making reinforced elastomeric high pressure hose comprising the steps of:
   first extruding a first layer of an uncured elastomer over a flexible mandrel coextensively therewith at a relatively high speed and coiling said layer on a reel,
   then uncoiling said layer and said mandrel and progressively freezing said layer at a relatively slow speed, tightly applying a first textile reinforcing layer over said first elastomer layer at said speed while said first layer is in a frozen state to prevent further extrusion thereof, said textile layer being applied with sufficient pressure to cause further extrusion of said layer in its unfrozen condition, wrapping an uncured elastomeric cushion layer over said first textile layer at said speed, tightly applying a second textile reinforcing layer over said cushion layer at said speed with said cushion layer being forced to enter and fill the spaced between the yarns of said textile layers and coiling the resulting structure on a reel, then further uncoiling said resulting structure and extruding an uncured elastomeric cover layer over said second textile layer at an intermediate speed faster than said slow speed and continuously curing said uncured elastomeric layers at said speed, and finally removing said mandrel from the resulting cured structure.

* * * * *